United States Patent
Xiao et al.

(10) Patent No.: US 10,935,793 B2
(45) Date of Patent: Mar. 2, 2021

(54) HEAD MOUNTED DISPLAY AND USING METHOD THEREOF

(71) Applicant: HTC Corporation, Taoyuan (TW)

(72) Inventors: Bo-Wen Xiao, Taoyuan (TW); Fu-Cheng Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/524,171

(22) Filed: Jul. 29, 2019

(65) Prior Publication Data

US 2020/0033605 A1 Jan. 30, 2020

Related U.S. Application Data

(60) Provisional application No. 62/712,180, filed on Jul. 30, 2018.

(51) Int. Cl.
*G02B 27/01* (2006.01)
*G02B 27/09* (2006.01)
*G02B 27/18* (2006.01)
*G02B 27/64* (2006.01)

(52) U.S. Cl.
CPC ..... *G02B 27/0172* (2013.01); *G02B 27/0977* (2013.01); *G02B 27/18* (2013.01); *G02B 27/646* (2013.01); *G02B 2027/0123* (2013.01)

(58) Field of Classification Search
CPC ............ G02B 27/0172; G02B 27/0977; G02B 27/18; G02B 27/646; G02B 2027/0123; G02B 27/0093; G02B 2027/0187
See application file for complete search history.

(56) References Cited

U.S. PATENT DOCUMENTS

2014/0266988 A1* 9/2014 Fisher .................... G06F 3/014
345/8
2015/0177831 A1 6/2015 Chan et al.
2018/0082482 A1 3/2018 Motta et al.

FOREIGN PATENT DOCUMENTS

WO 2018057991 3/2018

OTHER PUBLICATIONS

"Search Report of Europe Counterpart Application", dated Nov. 15, 2019, p. 1-p. 8.

(Continued)

*Primary Examiner* — Rodney Amadiz
(74) *Attorney, Agent, or Firm* — JCIPRNET

(57) ABSTRACT

A head mounted display comprises a light sensor, a first light source, a second light source, a transflective mirror, a lens, a display and a filter. The first light source is used for generating a first light beam. The second light source is used for generating a second light beam. The transflective mirror is provided on the light paths of the first light beam and the second light beam. The first light source is provided at the periphery of the lens or the light sensor. The first light beam is reflected by a first object, and enters the light sensor via the lens and the transflective mirror in sequence. The second light source is provided at the periphery of the filter. After leaving the second light source, the second light beam is reflected by a second object outside the head mounted display first, and then enters the light sensor via the filter and the transflective mirror in sequence. A using method of the head mounted display is also provided.

20 Claims, 5 Drawing Sheets

(56) References Cited

OTHER PUBLICATIONS

Tobii, "Tobii Unveils Next-Generation Eye Tracking Platform Targeting Consumer Devices," retrieved on Feb. 5, 2020, Available at: https://www.tobii.com/group/news-media/press-releases/tobii-unveils-next-generation-eye-tracking-platform-targeting-consumer-devices/.

Ian Failes, "Tech preview: Cubic Motion's Persona," retrieved on Feb. 5, 2020, Available at: https://beforesandafters.com/2019/04/16/tech-preview-cubic-motions-persona/.

Cherlynn Low, "Leap Motion will bring your hands into mobile VR," retrieved on Feb. 5, 2020, Available at: https://www.engadget.com/2016/12/05/leap-motion-will-bring-your-hands-into-mobile-vr/.

Afriten Technologies, "Leap Motion Controller is Available in South Africa—Allowing Gesture-Based Precise Hand Interaction," retrieved on Feb. 5, 2020, Available at: https://afriten.co.za/portfolios/leap-motion-sensor-gesture-based-interaction-hand-tracking/.

"Office Action of Taiwan Counterpart Application," dated Dec. 3, 2019, p. 1-p. 8.

\* cited by examiner

HEAD MOUNTED DISPLAY AND USING METHOD THEREOF

CROSS-REFERENCE TO RELATED APPLICATION

This application claims the priority benefit of U.S. provisional application Ser. No. 62/712,180, filed on Jul. 30, 2018. The entirety of the above-mentioned patent application is hereby incorporated by reference herein and made a part of this specification.

BACKGROUND OF THE INVENTION

1. Field of the Invention

The present invention relates to a display and a using method thereof, in particular, to a head mounted display and a using method thereof.

2. Description of Related Art

In recent years, head mounted displays (HMD), for example, virtual reality (VR) displays, gradually become popular products on the market. In order to purchase more simulation and sociability of the virtual world, the purposes may be achieved by using eye tracing devices, lip tracing devices and gesture tracing device. However, the eye tracing devices, lip tracing devices and gesture tracing device are all independent devices. That is, a user must wear all the tracing devices on the body besides the head mounted display if needing all the tracing functions, and thus, comfortableness is sacrificed and then the experience of the user is poor.

SUMMARY OF THE INVENTION

The present invention provides a head mounted display and a using method thereof, which has the functions of eye tracing, lip tracing and gesture tracing at the same time, and the experience of the user is good.

The head mounted display of an embodiment of the present invention comprises a light sensor, an optical module, a first light source and a second light source. The optical module is provided in the head mounted display. The first light source is used for generating a first light beam to a first object. The first light source is provided in the head mounted display. A first reflected light beam of the first light beam enters the light sensor via the optical module. The second light source is used for generating a second light beam to a second object, the second light beam forms an included angle relative to the first light beam, and a second reflected light of the second light beam is refracted to the light sensor by the optical module.

In an embodiment of the present invention, the light sensor is switched by time sequence or frequency to sense different first reflected light beams or second reflected light beams.

In an embodiment of the present invention, the first light source generates the first light beam by a first frequency, and the second light source generates the second light beam by a second frequency. The first frequency is different from the second frequency.

In an embodiment of the present invention, the light sensor senses the first reflected light beam or the second reflected light beam according to the first frequency of the first light source or the second frequency of the second light source.

In an embodiment of the present invention, the optical module switches the refraction angle of the different first reflected light beams or second reflected light beams in the optical module.

In an embodiment of the present invention, the optical module controls the time point for the second reflected light beam to enter the optical module.

In an embodiment of the present invention, the included angle is larger than 45 degrees.

In an embodiment of the present invention, the second light source is provided on the housing surface of the head mounted display downwards relative to the first light source.

In an embodiment of the present invention, the distance for the second light beam to pass through the space is longer than 2 times of the distance for the first light beam to pass through the space.

In an embodiment of the present invention, the head mounted display further comprises a display, the display faces the inside of the head mounted display, and the direction of an image generated by the display is the same as the advancing direction of the first light beam.

The head mounted display of an embodiment of the present invention comprises a light sensor, a first light source, a second light source, a transflective mirror, a lens, a display and a filter. The first light source is used for generating a first light beam. The second light source is used for generating a second light beam. The transflective mirror is provided on the light paths of the first light beam and the second light beam. The first light source is provided at the periphery of the lens or the light sensor. The first light beam is reflected by a first object, and then enters the light sensor by passing through the lens and being reflected by the transflective mirror in sequence. An image displayed by the display passes through the transflective mirror and the lens in sequence. The second light source is provided at the periphery of the filter. The second light beam is reflected by a second object outside the head mounted display first after leaving the second light source, and then enters the light sensor via the filter and the transflective mirror in sequence.

In an embodiment of the present invention, the first light source and the second light source are infrared light sources.

In an embodiment of the present invention, the light sensor is an infrared light sensor.

In an embodiment of the present invention, the transflective mirror is an infrared light transflective mirror.

In an embodiment of the present invention, the filter is an infrared light filter.

In an embodiment of the present invention, the head mounted display further comprises a third light source. The third light source is used for generating a third light beam, wherein the first light source is provided at the periphery of the lens. The first light beam is reflected by the first object first after leaving the first light source and then enters the light sensor by passing through the lens and being reflected by the transflective mirror in sequence. The third light source is provided at the periphery of the light sensor. The third light beam is reflected by the first object by being reflected by the transflective mirror and passing through the lens in sequence after leaving the third light source, and then enters the light sensor by passing through the lens and being reflected by the transflective mirror in sequence.

In an embodiment of the present invention, the head mounted display further comprises a fourth light source. The fourth light source is used for generating a fourth light beam, wherein the fourth light source is provided at the periphery of the filter. The second light beam is reflected by the second object first after leaving the second light source, and then enters the light sensor via the filter and the transflective mirror in sequence. The fourth light beam is reflected by a third object outside the head mounted display first after leaving the fourth light source, and enters the light sensor via the filter and the transflective mirror in sequence.

A using method of the head mounted display of an embodiment of the present invention comprises: turning on the first light source and the second light source of the head mounted display, so that the first light source generates a first light beam to irradiate to a first object, and the second light source generates a second light beam to irradiate to a second object; acquiring an image of the first object and an image of the second object by using a light sensor of the head mounted display; and calculating the change of the image of the first object and the change of the image of the second object, so as to correspondingly adjust the image displayed by a display of the head mounted display.

In an embodiment of the present invention, the first light source and the second light source are turned on at the same time, so that the light sensor acquires the image of the first object and the image of the second object at the same time.

In an embodiment of the present invention, the first light source and the second light source are turned on in turn, so that the light sensor acquires the image of the first object and the image of the second object in turn.

Based on the foregoing, in the head mounted display and the using method thereof of an embodiment of the present invention, the first light beam and the second light beam may be used to acquire the image of the first object and the image of the second object. The first object, for example, is the eyes of the user, and the second object, for example, is the lips or hands of the user. Therefore, the head mounted display and the using method thereof of the embodiment of the present invention may have the functions of eye tracing and lip tracing or gesture tracing, and may provide a good experience for the user.

In order to make the aforementioned and other objectives and advantages of the present invention comprehensible, embodiments accompanied with figures are described in detail below.

DESCRIPTION OF THE EMBODIMENTS

Figure 1:
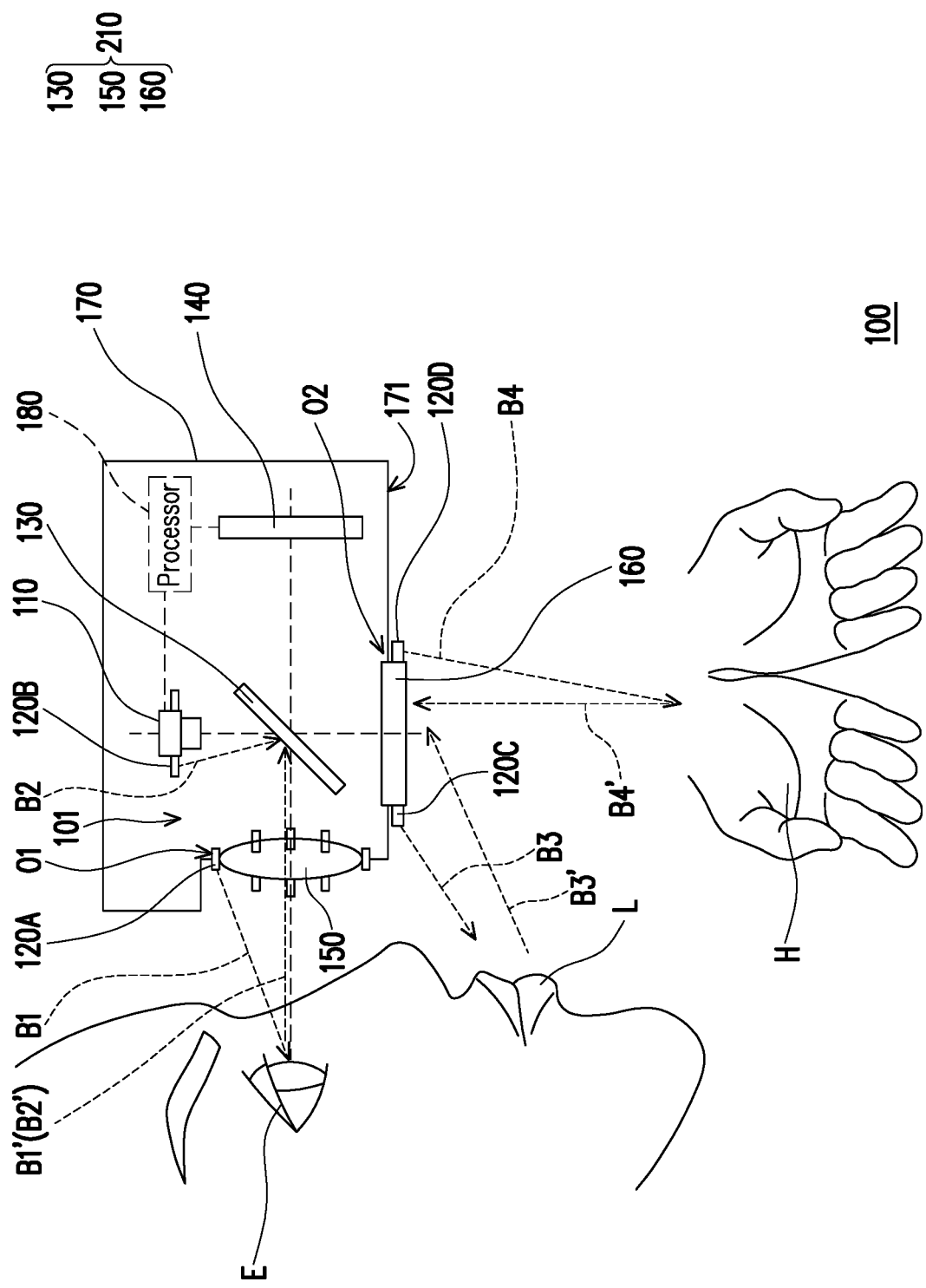
FIG. 1 is a schematic diagram of a head mounted display according to an embodiment of the present invention.

FIG. 1 is a schematic diagram of a head mounted display 100 according to an embodiment of the present invention. Please refer to FIG. 1, the head mounted display 100 of the embodiment comprises a light sensor 110, a first light source, a second light source, a transflective mirror 130, a lens 150, a display 140 and a filter 160. The filter 160 may be an electronic filter, a low-pass filter, a high-pass filter, a band-pass filter, a band-rejection filter, an all-pass filter, an atomic line filter or a mechanical filter. The light sensor 110 may be a video camera.

In the embodiment, the head mounted display 100 further comprises a housing 170. The light sensor 110, the transflective mirror 130 and the display 140 are provided in the housing 170. The housing 170 has a first opening O1 and a second opening O2. The lens 150 is provided on the first opening O1. The first opening O1 faces a first object E, so that light beams B1 and B2 emitted by light sources 120A and 120B and an image displayed by the display 140 are projected to the first object E. Moreover, the filter 160 is provided on the second opening O2. The second opening O2 faces a second object L or a third object H, so that light beams B3 and B4 emitted by light sources 120C and 120D are projected to the second object L or the third object H. In an embodiment, the first object E, for example, is the eyes of the user, the second object L, for example, is the lips or hands of the user, and the third object H, for example, is the lips or hands of the user. The present invention is not limited herein, and the first object E, the second object L and the third object H may be any part of the body of the user respectively.

In the embodiment, the first light source is used for generating a first light beam. The first light source, for example, is light source 120A or 120B or combination of the two. The first light beam, for example, is light beam B1 or B2. The second light source is used for generating a second light beam. The second light source, for example, is light source 120C or 120D or combination of the two. The second light beam, for example, is light beam B3 or B4. Moreover, the light sources 120A to 120D may be light emitting diode (LED) or laser diode (LD). The quantities of light sources 120A to 120D may be one or more respectively.

In the embodiment, the first light source is provided at the periphery of the lens 150 or the light sensor 110. For example, the light source 120A is provided at the periphery of the lens 150, and the light source 120B is provided at the periphery of the light sensor 110. FIG. 1 simply shows that the head mounted display 100 has one lens 150, but the present invention is not limited herein. The lens 150 may be a plurality of lens, a lens assembly or a combination thereof. Moreover, the second light source of the embodiment is provided at the periphery of the filter 160. For example, the light sources 120C and 120D are provided at the periphery of the filter 160.

In the embodiment, the transflective mirror 130 is provided on the light paths of the first light beam and the second light beam. Moreover, in order to prevent light beams B1 to B4 emitted by the light sources 120A to 120D from disturbing the image displayed by the display 140, which affects the experience of the user, the image displayed by the display 140, for example, may be a visible light image, while the first light source and the second light source may be infrared light sources or other invisible lights. Therefore, the user cannot see images formed by the first light beam and the second light beam. However, the present invention is not limited herein, and the wavelengths of the first light source and the second light source may be also selected according to requirements. Furthermore, the light sensor 110 may be an infrared light sensor, the filter 160 may be an infrared light filter, and the transflective mirror 130 may be an infrared light transflective mirror. That is, when the transflective mirror 130 is the infrared transflective mirror, the transflective mirror 130 may cause 50% of the passing infrared light to pass and 50% of the passing infrared light to be reflected, the proportion of the penetrating light and the reflected light are only examples and are not used for limiting, and rays of other passing non-infrared lights may pass. Therefore, the transflective mirror 130 cannot affect the user in watching the image of the display 140, and the light sensor 110 does not receive the image of the display 140. Moreover, when the filter 160 is the infrared light filter, the filter 160 may allow light beams B3 and B4 of the light sources 120C and 120D to pass, and prevent rays of wavelengths of other non-infrared lights from passing. Therefore, the filter 160 is capable of preventing external stray light from entering the head mounted display 100 to affect the experience of the user.

In the embodiment, the image displayed by the display 140 enters the first object E via the transflective mirror 130 and the lens 150 in sequence.

In the embodiment, the first light beam is reflected by the first object E, and then enters the light sensor 110 by passing through the lens 150 and being reflected by the transflective mirror 130 in sequence. The second light beam is reflected by the second object L outside the head mounted display 100 first after leaving the second light source, and then enters the light sensor 110 via the filter 160 and the transflective mirror 130 in sequence.

In the embodiment, the light source 120A is provided at the periphery of the lens 150, while the light source 120B is provided at the periphery of the light sensor 110. The light beam B1 provided by the light source 120A is reflected by the first object E first after leaving the light source 120A to generate a reflected light beam B1'. The light beam B1' then enters the light sensor 110 by passing through the lens 150 and being reflected by the transflective mirror 130. The light beam B2 provided by the light source 120B is reflected by the transflective mirror 130 after leaving the light source 120B, passes through the lens 150, and is reflected by the first object E to generate a reflected light beam B2'. The light beam B2' then enters the light sensor 110 by passing through the lens 150 and being reflected by the transflective mirror 130. However, the head mounted display 100 of the embodiment may also only have one of the light source 120A and the light source 120B, as long as the light sensor 110 acquires the image of the first object E.

Moreover, in the embodiment, the light source 120C and the light source 120D are provided at the periphery of the filter 160. The light beam B3 provided by the light source 120C is reflected by the second object L first after leaving the light source 120C to generate a reflected light beam B3'. The light beam B3' then enters the light sensor 110 via the filter 160 and the transflective mirror 130 in sequence. The light beam B4 provided by the light source 120D is reflected by the third object H first after leaving the light source 120D to generate a reflected light beam B4'. The light beam B4' then enters the light sensor 110 via the filter 160 and the transflective mirror 130 in sequence. However, the head mounted display 100 of the embodiment may also only have one of the light source 120C and the light source 120D, that is, the light sensor 110 may also only acquire the image of the second object L or the third object H.

In addition to this, the light sources 120A and 120B of the embodiment emit light beams B1 and B2 to irradiate to the first object E. The light sensor 110 receives the light beams B1' and B2' reflected by the first object E to acquire the image of the first object E. The image of the first object E comprises reflecting glint points generated by irradiation of the light beams B1 and B2 to the first object E. For example, the first object E may be eyes of the user. The light source 120A is capable of emitting an off-axis light beam B1, so as to generate the reflecting glint points at the periphery of the pupils of the eyes. Moreover, when the size of the light sensor 110 is small enough or the distance from the light sensor 110 to the eyes is far enough, the light source 120B is capable of emitting an on-axis light beam B2, so as to generate reflecting glint points at the centers of the eyes. When the light source 120A emits the off-axis light beam B1 and the light source 120B emits the on-axis light beam B2 at the same time, the eyeball tracing precision of the head mounted display 100 may be further improved. Moreover, the head mounted display 100 of the embodiment adopts an on-axis light sensor 110, and compared with a known head mounted display using an off-axis light sensor, the head mounted display 100 of the embodiment is better in image acquiring precision. Moreover, the head mounted display 100 of the embodiment is capable of acquiring the image of the first object E and the image of the second object L or the third object H just by using one light sensor 110, so that the head mounted display 100 has the functions of eye tracking and lip tracing or gesture tracing at the same time. Compared with the situation that the known head mounted display must use a plurality of different light sensors for different tracing functions, the head mounted display 100 of the embodiment may further reduce the volume and lower the production cost.

In an embodiment, the head mounted display 100 further comprises a processor 180. The processor 180 is electrically connected with the light sensor 110 and the display 140. The processor 180 receives the image of the first object E and the image of the second object L or the third object H acquired by the light sensor 110 first, and then calculates the change of the image of the first object E and the change of the image of the second object L or the third object H, so as to correspondingly adjust the image displayed by the display 140 of the head mounted display 100. For example, the processor 180 performs corresponding eye rotation, lip position change and hand gesture on a virtual figure displayed by the display 140 and seen by the user according to the change of images of the eyes, lips and hands of the user. Furthermore, the processor 180 of the head mounted display 100 may also judge the looking direction of the user according to the image of the eyes of the user, so as to adjust the image displayed by the display to conform to the sight change of the user.

The processor 180, for example, is a central processing unit (CPU), a microprocessor, a digital signal processor (DSP), a programmable controller, a programmable logic device (PLD) or other similar devices or combination of these devices, which is not limited by the present invention. Moreover, in an embodiment, various functions of the processor 180 may be actually used as a plurality of program codes. These program codes will be stored in a memory, and are executed by the processor 180. Or, in an embodiment, various functions of the processor 180 may be actually used as one or more circuits. The present invention does not limit that a software or hardware manner is used for implementing various functions of the processor 180.

Based on the foregoing, in the head mounted display 100 of an embodiment of the present invention, the first light source is provided at the periphery of the lens 150 or the light sensor 110, and the second light source is provided at the periphery of the filter 160. Therefore, the head mounted display 100 is capable of generating a first light beam via the first light source to acquire the image of the first object E, and the head mounted display 100 is capable of generating a second light beam via the second light source to acquire the image of the second object L. The head mounted display of the embodiment of the present invention may have the functions of eye tracing and lip tracing or gesture tracing at the same time, and therefore, the head mounted display 100 may realize a good experience of the user.

Figure 2:
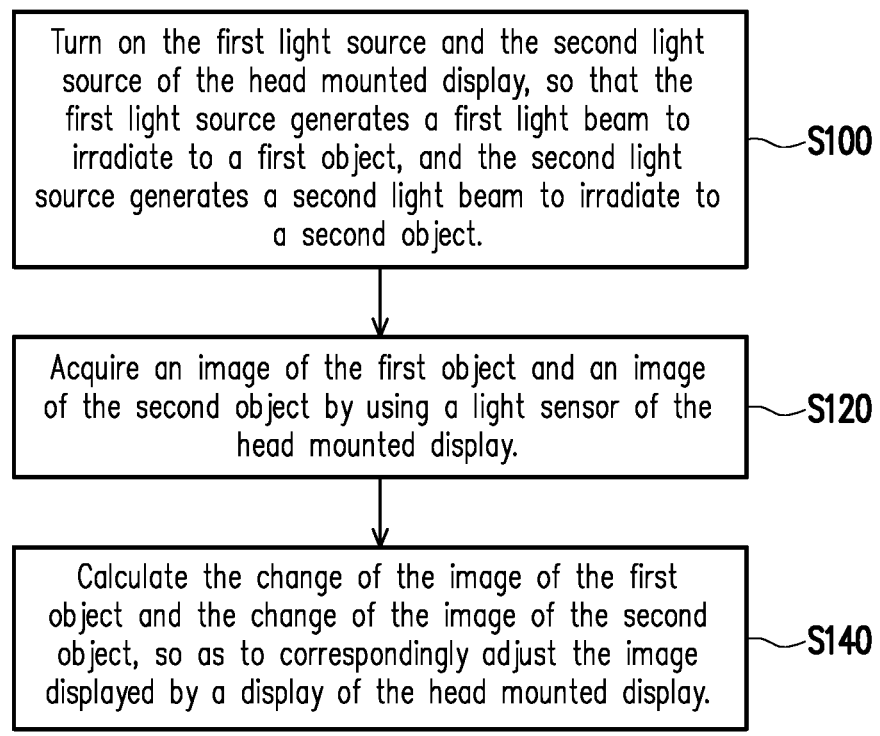
FIG. 2 is a flow diagram of a using method of the head mounted display according to an embodiment of the present invention.

FIG. 2 is a flow diagram of a using method of the head mounted display 100 according to an embodiment of the present invention. Please refer to FIG. 2, the using method of the head mounted display 100 of the embodiment comprises the following steps: step S100, turning on the first light source and the second light source of the head mounted display 100, so that the first light source generates a first light beam to irradiate to a first object E, and the second light source generates a second light beam to irradiate to a second object L; step S120, acquiring an image of the first object E and an image of the second object L by using a light sensor 110 of the head mounted display 100; and step S140, calculating the change of the image of the first object E and the change of the image of the second object L, so as to correspondingly adjust the image displayed by a display 140 of the head mounted display 100.

The first light source, for example, is the light sources 120A and 120B of FIG. 1, and the first light beam, for example, is the light beams B1 and B2. The second light source, for example, is the light sources 120C and 120D of FIG. 1, and the second light beam, for example, is the light beams B3 and B4.

In addition to this, in the using method of the head mounted display 100 of an embodiment, the first light source and the second light source are turned on at the same time, so that the light sensor 110 acquires the image of the first object E and the image of the second object L at the same time, and captures the image of the first object E and the image of the second object L respectively from the comprehensive image. Therefore, the image of the first object E and the image of the second object L may be acquired continuously without interruption, so that the processor 180 changes the image displayed by the display 140 in real time according to the change of the images of the first object E and the second object L.

Or, in the using method of the head mounted display 100 of an embodiment, the head mounted display 100 turns on the first light source and the second light source in turn, so that the light sensor 110 acquires the image of the first object E and the image of the second object L in turn. Therefore, pure image of the first object E and image of the second object L may be acquired, and load on image processing is reduced, so that the processor 180 is capable of changing the image displayed by the display 140 accurately according to the change of the image of the first object E and the change of the image of the second object L.

Based on the foregoing, in the using method of the head mounted display 100 of an embodiment of the present invention, the light sensor 110 of the head mounted display 100 is used for acquiring the image of the first object E and the image of the second object L. Therefore, the using method of the head mounted display 100 of the embodiment of the present invention has the functions of eye tracing and lip tracing or gesture tracing at the same time. The using method of the head mounted display 100 also achieves a good experience of the user.

Figure 3:
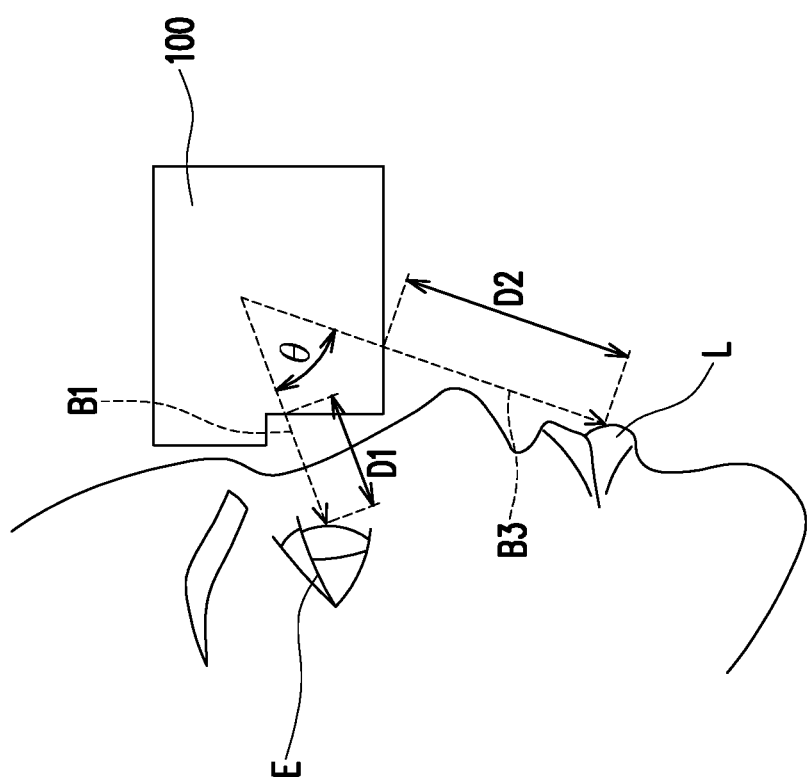
FIG. 3 is a schematic diagram of transmission of a first light beam and a second light beam of the head mounted display in space according to an embodiment of the present invention.

FIG. 3 is a schematic diagram of transmission of a first light beam and a second light beam of the head mounted display in space according to an embodiment of the present invention. Please refer to FIG. 1 and FIG. 3 at the same time, the head mounted display 100 of the embodiment comprises a light sensor 110, an optical module 210, a first light source and a second light source. The optical module 210 is provided in the head mounted display 100. In the embodiment, the second light source is provided on the housing surface 171 of the head mounted display 100 downwards relative to the first light source. The optical module 210 of the embodiment comprises a half-penetrating reflecting optical sheet 130, a filter 160 and a lens 150, and is not limited herein.

In the embodiment, the first light source is used for generating a first light beam to the first object E. The first light source is provided in the head mounted display 100, the first reflected light beam of the first light beam enters a light sensor 110 via the optical module 210. The first light source, for example, is the light sources 120A and 120B or combination of the two. The first light beam, for example, is the light beam B1 or B2, and the first reflected light beam is the light beam B1' or B2', wherein the reflected light beam of the light beam B1 is B1', and the reflected light beam of the light beam B2 is B2'.

In the embodiment, the second light source is used for generating a second light beam to a second object. The second light beam forms an included angle θ relative to the first light beam. The second reflected light beam of the second light beam is refracted to the light sensor 110 via the optical module 210. The second light source, for example, is light sources 120C, 120D or combination of the two. The second light beam, for example, is the light beam B3 or B4, and the second reflected light beam is the light beam B3' or B4', wherein the reflected light beam of the light beam B3 is B3', and the reflected light beam of the light beam B4 is B4'. In the embodiment, the included angle θ is larger than 45 degrees. The present invention is not limited herein.

In the embodiment, the optical module 210 switches the refraction angle of different first reflected light beams or second reflected light beams in the optical module 210, and the optical module 210 controls the time point for the second reflected light beam to enter the optical module.

Moreover, in the embodiment, the distance for the second light beam to pass through the space is longer than 2 times of the distance for the first light beam to pass through the space. The distance for the light beam to pass through the space is an optical path from a position emitting light beam from the light source to an object irradiated by the light beam. For example, the optical path from the light beam B1 to the first object E is D1, and the optical path from the light beam B3 to the second object L is D2, wherein the optical path D2 is longer than 2 times of the optical path D1.

In addition to this, the head mounted display 100 of the embodiment further comprises a display 140. The display 140 faces the inside 101 of the head mounted display 100. The direction of the image generated by the display 140 is the same as the advancing direction of the first light beam.

Figure 4:
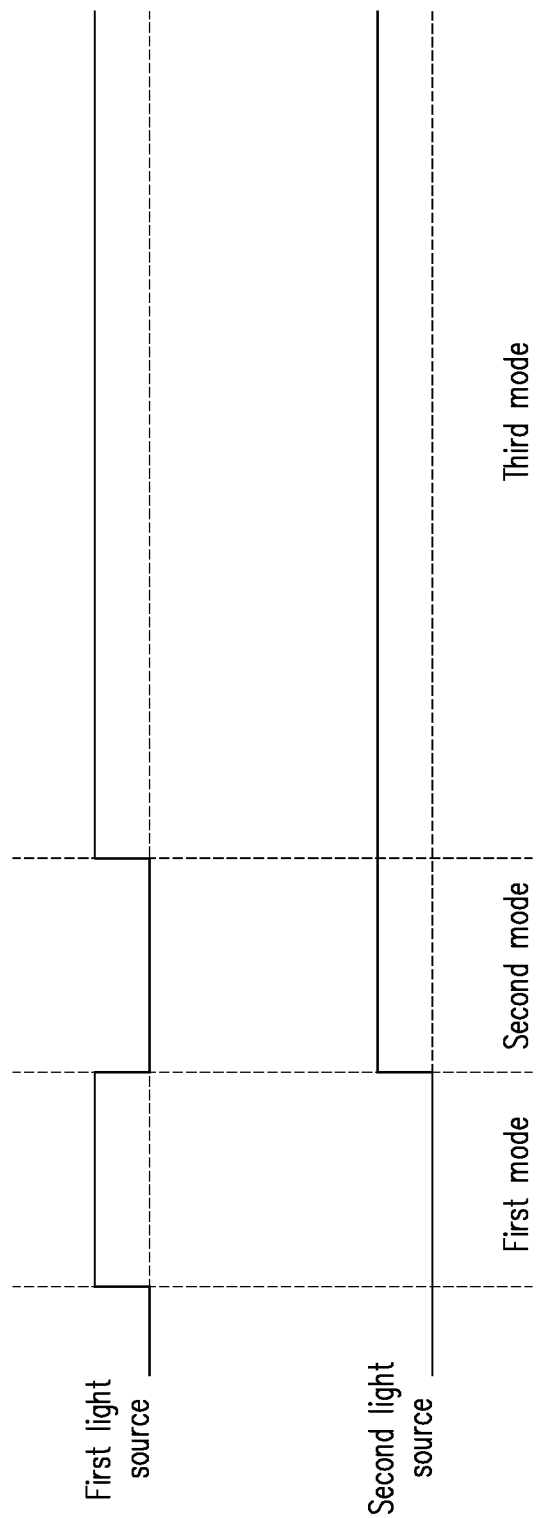
FIG. 4 is a schematic diagram that the head mounted display is in a first mode, a second mode and a third mode respectively according to an embodiment of the present invention.
Figure 5:
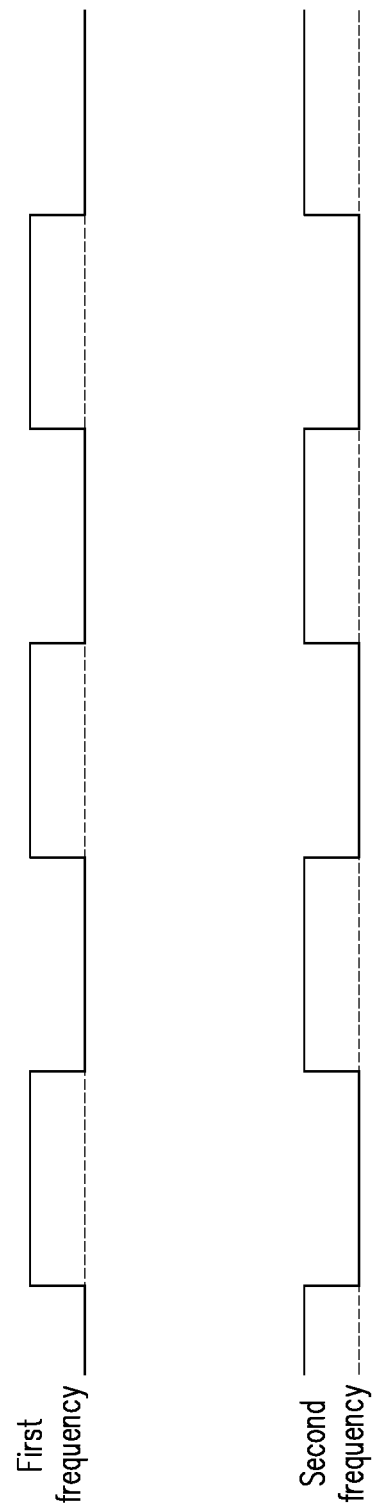
FIG. 5 is a schematic diagram that a first light source of the head mounted display generates a first light beam by a first frequency and a second light source generates a second light beam by a second frequency according to an embodiment of the present invention.

FIG. 4 is a schematic diagram that the head mounted display is in a first mode, a second mode and a third mode respectively according to an embodiment of the present invention. FIG. 5 is a schematic diagram that a first light source of the head mounted display generates a first light beam by a first frequency and a second light source generates a second light beam by a second frequency according to an embodiment of the present invention. Please refer to FIG. 4 and FIG. 5 at the same time, in the embodiment, the light sensor 110 is capable of being switched by time sequence or frequency to sense different first reflected light beams or second reflected light beams. For example, when the head mounted display 100 only turns on the first light source, the head mounted display 100 is in the first mode, so that the light sensor 110 only senses the first reflected light beam. When the head mounted display 100 only turns on the second light source, the head mounted display 100 is in the second mode, so that the light sensor 110 only senses the second reflected light beam. Moreover, when the head mounted display 100 turns on the first light source and the second light source at the same time, the head mounted display 100 is in the third mode, so that the light sensor 110 senses the first reflected light beam and the second reflected light beam at the same time. Different modes correspond to different use situations. That is, the head mounted display 100 of the embodiment of the present invention may comprise the first, second and third modes and the like or more time sequences, so that the light sensor 110 senses different reflected light beams by switching. The head mounted display 100 is capable of correspondingly generating time sequences for sensing the reflected light beams according to the use situations. For example, in some use situations, only the lip actions, eye actions or gesture of the user need to be sensed, while in other situations, it may be necessary to sense actions of a plurality of parts of the human body at the same time.

The light sensor 110 senses different reflected light beams by time sequence switching by taking two groups of light sources as an example, but the present invention is not limited herein. The head mounted display 100 may comprise a plurality of groups of light sources, for example, four groups of light sources 120A, 120B, 120C and 120D. Therefore, a plurality of light sources may generate a plurality of groups of modes corresponding to different use situations.

Moreover, in the embodiment, the light sensor 110 is capable of sensing different first reflected light beams or second reflected light beams by frequency switching. The light sensor 110 senses the first reflected light beam or the second reflected light beam according to the frequency of the first light source or the second light source.

In the embodiment, the first light source generates the first light beam by a first frequency, the second light source generates the second light beam by a second frequency, and the first frequency is different from the second frequency, but the present invention is not limited herein.

For example, the frequency of the first light source, for example, is the first frequency of FIG. 5, and the frequency of the second light source, for example, is the second frequency of FIG. 5, wherein the first frequency is different from the second frequency. That is, the head mounted display 100 of the embodiment may sense reflected light beam signals of the first light source and the second light source in turn by utilizing a manner of time cutting, so as to reduce the image analysis difficulty.

To sum up, in the head mounted display of an embodiment of the present invention, the first light source is provided at the periphery of the lens or the light sensor, and the second light source is provided at the periphery of the filter. Therefore, the head mounted display is capable of generating the first light beam via the first light source to acquire the image of the first object, and the head mounted display is capable of generating the second light beam via the second light source to acquire the image of the second object. In addition to this, in the head mounted display of an embodiment of the present invention, the first reflected light beam and the second reflected light beam may be used to acquire the image of the first object and the image of the second object. The first object, for example, is the eyes of the user, and the second object, for example, is the lips or hands of the user. The head mounted display of the embodiment of the present invention may have the functions of eye tracing and lip tracing or gesture tracing at the same time, and therefore, the head mounted display may achieve a good experience of the user. Furthermore, in the using method of the head mounted display of an embodiment of the present invention, the light sensor of the head mounted display is used for acquiring the image of the first object and the image of the second object. Therefore, adopting the using method of the head mounted display of the embodiment of the present invention may have the functions of eye tracing and lip tracing or gesture tracing at the same time. The using method of the head mounted display may also achieve a good experience of the user.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A head mounted display, comprising:
   a light sensor;
   an optical module, provided in the head mounted display;
   a first light source, used for generating a first light beam to a first object, the first light source being provided on the head mounted display, and a first reflected light beam of the first light beam entering the light sensor via the optical module; and
   a second light source, used for generating a second light beam to a second object, the second light beam forms an included angle relative to the first light beam, and a second reflected light beam of the second light beam being refracted to the light sensor via the optical module.

2. The head mounted display according to claim 1, wherein the light sensor is switched by time sequence or frequency to sense different first reflected light beams or second reflected light beams.

3. The head mounted display according to claim 2, wherein the first light source generates the first light beam by a first frequency, and the second light source generates the second light beam by a second frequency, the first frequency being different from the second frequency.

4. The head mounted display according to claim 3, wherein the light sensor senses the first reflected light beam or the second reflected light beam according to the first frequency of the first light source or the second frequency of the second light source.

5. The head mounted display according to claim 1, wherein the optical module switches the refraction angle of the different first reflected light beams or second reflected light beams in the optical module.

6. The head mounted display according to claim 1, wherein the optical module controls a time point for the second reflected light beam to enter the optical module.

7. The head mounted display according to claim 1, wherein the included angle is larger than 45 degrees.

8. The head mounted display according to claim 1, wherein the second light source is provided on the housing surface of the head mounted display downwards relative to the first light source.

9. The head mounted display according to claim 1, wherein a distance for the second light beam to pass through a space is longer than 2 times of a distance for the first light beam to pass through the space.

10. The head mounted display according to claim 1, further comprising a display, the display facing the inside of the head mounted display, and the direction of an image generated by the display being the same as the advancing direction of the first light beam.

11. A head mounted display, comprising:
a light sensor;
a first light source, used for generating a first light beam;
a second light source, used for generating a second light beam;
a transflective mirror, provided on the light paths of the first light beam and the second light beam;
a lens, the first light source being provided at the periphery of the lens or the light sensor, and the first light beam being reflected by a first object, and then entering the light sensor by passing through the lens and being reflected by the transflective mirror in sequence;
a display, an image displayed by the display passing through the transflective mirror and the lens in sequence; and
a filter, the second light source being provided at the periphery of the filter, and the second light beam being reflected by a second object outside the head mounted display first after leaving the second light source, and then entering the light sensor via the filter and the transflective mirror in sequence.

12. The head mounted display according to claim 11, wherein the first light source and the second light source are infrared light sources.

13. The head mounted display according to claim 11, wherein the light sensor is an infrared light sensor.

14. The head mounted display according to claim 11, wherein the transflective mirror is an infrared light transflective mirror.

15. The head mounted display according to claim 11, wherein the filter is an infrared light filter.

16. The head mounted display according to claim 11, further comprising a third light source, used for generating a third light beam, the first light source being provided at the periphery of the lens, the first light beam being reflected by the first object first after leaving the first light source and then entering the light sensor by passing through the lens and being reflected by the transflective mirror in sequence, the third light source being provided at the periphery of the light sensor, and the third light beam being reflected by the first object by being reflected by the transflective mirror and passing through the lens in sequence after leaving the third light source, and then entering the light sensor by passing through the lens and being reflected by the transflective mirror in sequence.

17. The head mounted display according to claim 11, further comprising a fourth light source, used for generating a fourth light beam, the fourth light beam being provided at the periphery of the filter, the second light beam being reflected by the second object first after leaving the second light source, and then entering the light sensor via the filter and the transflective mirror in sequence, and the fourth light beam being reflected by a third object outside the head mounted display first after leaving the fourth light source, and entering the light sensor via the filter and the transflective mirror in sequence.

18. A using method of a head mounted display, comprising:
turning on a first light source and a second light source of the head mounted display, so that the first light source generates a first light beam to irradiate to a first object, and the second light source generates a second light beam to irradiate to a second object;
acquiring an image of the first object and an image of the second object by using a light sensor of the head mounted display; and
calculating the change of the image of the first object and the change of the image of the second object, so as to correspondingly adjust the image displayed by a display of the head mounted display.

19. The using method of the head mounted display according to claim 18, the first light source and the second light source being turned on at the same time, so that the light sensor acquires the image of the first object and the image of the second object at the same time.

20. The using method of the head mounted display according to claim 18, the first light source and the second light source being turned on in turn, so that the light sensor acquires the image of the first object and the image of the second object in turn.

\* \* \* \* \*